No. 863,139. PATENTED AUG. 13, 1907.
W. J. BECKER, AN INSANE PERSON.
W. C. BECKER, GUARDIAN.
WATER COOLED STIRRING SHAFT FOR ROASTING FURNACES.
APPLICATION FILED MAY 16, 1904.
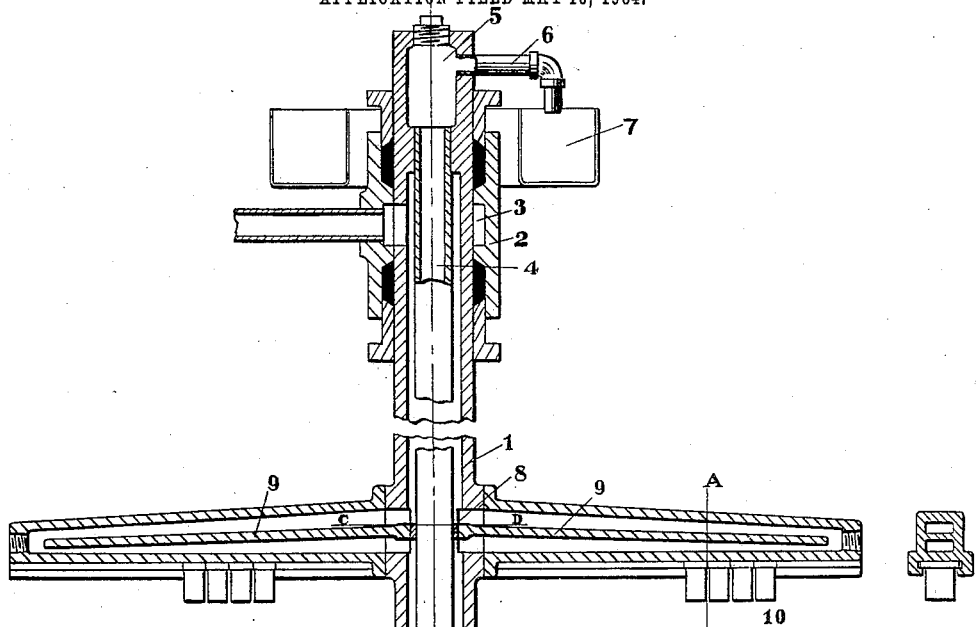
Fig. 1
Fig. 3
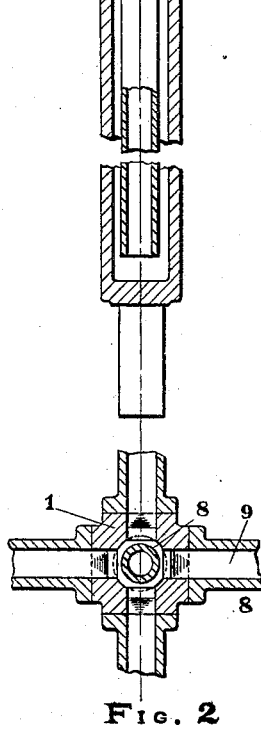
Fig. 2
WITNESSES:
Ella Brickell
W. G. Starkweather.
INVENTOR.
W. J. Becker

UNITED STATES PATENT OFFICE.

WILLIAM J. BECKER, OF MILWAUKEE, WISCONSIN; WILLIAM C. BECKER GUARDIAN OF SAID WILLIAM J. BECKER, AN INSANE PERSON.

WATER-COOLED STIRRING-SHAFT FOR ROASTING-FURNACES.

No. 863,139.     Specification of Letters Patent.     Patented Aug. 13, 1907.

Application filed May 16, 1904. Serial No. 208,268.

*To all whom it may concern:*

Be it known that I, WILLIAM J. BECKER, a citizen of the United States, residing at Milwaukee, in the county of Milwaukee and State of Wisconsin, have invented certain new and useful Improvements in Water-Cooled Stirring-Shafts for Roasting-Furnaces, of which the following is a specification.

My invention relates to an improved water cooled stirring shaft for roasting furnaces.

The objects of the invention will appear from the following specification and be illustrated in the accompanying drawings, in which,—

Figure 1 is a sectional view through the stirring shaft and arms. Fig. 2 is a horizontal section through the shaft and arms. Fig. 3 is a section through the stirrer arm on the line *a a*.

The stirrer shaft 1 is hollow throughout its length and closed at the bottom. Surrounding the shaft is a water supply chamber 2, provided with a hollow chamber 3, and a feed pipe connected thereto. The stirrer shaft is mounted to revolve in the supply chamber, and provided with glands and packing to avoid leakage. Openings are provided in the stirrer shaft for permitting the water to enter. An outlet pipe 4, extending to within a short distance of the bottom of the shaft, is fast thereto at the top, and is connected with an outlet chamber 5, having an outlet pipe 6, which empties into the trough 7. At intervals corresponding to the stirrer arms, small collars 8 are mounted on the inner pipe, having plane surfaces at the points where the stirrer arms are connected. The stirrer arms are provided with horizontal partitions 9 which extend outside of the hollow part of the arms and in contact with the plane surfaces provided on the collars. The stirrer arms are suitably fastened to flange provided on the outside of the shaft. Stirrer teeth 10 are provided, as usual.

The circulation of the water is as follows: Entering through the feed pipe, the water flows to the first collar 8, 9. Openings are provided at the end of these partitions for permitting the circulation of the water. Water passes through these openings and around the partition into the lower part of the hollow shaft, down through the second set of stirrer arms, and so on until it reaches the bottom of the shaft; it then rises through the central pipe into the chamber 5, through the pipe 6, and into the trough.

A number of advantages are apparent in this construction. The cooling effect is greater when the water is delivered from the shaft through a central pipe, as the hot surfaces come in direct contact with the cold water. Passing the water through the shaft and arms in series vertically and in parallel radially as shown, utilizes the cooling effect to a greater degree. The hottest portion of the furnace is the upper portion, and consequently it should come in contact with the coldest part of the water, which is the case in the construction shown. The stirrer arms, which are subjected to great strain, are very much strengthened by the central partitions. These partitions likewise prevent contraction of the metal through differences of the temperature, and consequent cracking and destruction of the arm.

What I claim as new and desire to secure by Letters Patent is as follows:

1. In a roasting furnace, a shaft, stirrer arms on the shaft, means for circulation through the shaft and arms vertically in series and radially in multiple, and inlet means and outlet means for the circulation means at one end of the shaft.

2. In a roasting furnace, a shaft, stirrer arms on the shaft, means for circulation through the shaft and arms vertically in series and radially in multiple, and inlet means and outlet means for the circulation means at the top of the shaft.

3. In a roasting furnace, a shaft, stirrer arms on the shaft, and circulation means comprising horizontal partitions in the arms separate shaft partitions registering with the arm partitions and a pipe in the shaft.

4. In a roasting furnace, a hollow shaft, hollow stirrer arms communicating with the shaft, a pipe within the shaft, partitions within the arms, collars on the pipe registering with the partitions, and inlet and outlet means communicating with the shaft.

5. In a roasting furnace, a hollow shaft, hollow stirrer arms communicating with the shaft, a pipe within the shaft fast thereto at one end and free at the other end, partitions in the arms, transverse partitions extending around the pipe and to the shaft and registering with the arm partitions, means of communication through the outer ends of the arm partitions, and inlet means and outlet means adjacent the fast end of the pipe.

6. In a roasting furnace, a hollow shaft, hollow stirrer arms attached to and communicating with the shaft, a pipe within the shaft fast thereto at one end and free at the other end, partitions in the arms extending beyond the same at the attaching end of the arms, transverse partitions extending around the pipe and to the shaft and registering with the extensions of the arm partitions, means of communication through the outer ends of the arm partitions, and inlet means and outlet means adjacent the fast end of the pipe.

In testimony whereof I affix my signature in presence of two witnesses.

WILLIAM J. BECKER.

Witnesses:
    W. G. STARKWEATHER,
    ELLA BRICKELL.